United States Patent [19]
Sample et al.

[11] Patent Number: 5,793,462
[45] Date of Patent: Aug. 11, 1998

[54] TEMPORARY READING EYEGLASSES

[75] Inventors: John B. Sample, Seattle; David W. Friant, Renton, both of Wash.

[73] Assignee: Seattle Micro Inc., Seattle, Wash.

[21] Appl. No.: 792,891

[22] Filed: Jan. 31, 1997

[51] Int. Cl.$^6$ ................................................. G02C 1/00
[52] U.S. Cl. ...................................... 351/41; 351/158
[58] Field of Search ............................. 351/41, 158, 51, 351/52, 111

[56] References Cited

U.S. PATENT DOCUMENTS

| | | |
|---|---|---|
| D. 44,756 | 10/1913 | Foster . |
| D. 44,757 | 10/1913 | Foster . |
| D. 44,758 | 10/1913 | Foster . |
| D. 44,759 | 10/1913 | Foster . |
| D. 50,385 | 2/1917 | Heckroth . |
| D. 150,639 | 8/1948 | McNeill . |
| D. 158,968 | 6/1950 | Jonassen . |
| D. 173,637 | 12/1954 | Brown . |
| D. 206,291 | 11/1966 | Nordhoff . |
| D. 308,876 | 6/1990 | Piper . |
| 2,509,793 | 5/1950 | Yost . |
| 2,792,744 | 5/1957 | Hirsch . |
| 3,526,449 | 9/1970 | Bollé et al. . |
| 4,707,088 | 11/1987 | Tabacchi . |
| 5,110,197 | 5/1992 | Arad . |
| 5,151,720 | 9/1992 | Kanbar . |
| 5,331,356 | 7/1994 | Chiou . |

*Primary Examiner*—Hung X. Dang
*Attorney, Agent, or Firm*—Christensen, O'Connor, Johnson & Kindness PLLC

[57] ABSTRACT

Temporary reading eyeglasses (11) in the form of a lorgnette that includes a relatively wide arm (15) and a pair of support feet (23) is disclosed. The support feet (23) are located at the upper outer corners of the frame (13) of the temporary reading eyeglasses (11) and include flat outer surfaces that lie orthogonal to the plane in which the frame (13) of the temporary reading eyeglasses (11) lies. The feet (23) provide a flat surface for supporting the temporary reading eyeglasses in an inverted position on a horizontal surface such that the arm (15) angles upwardly. The relatively wide arm (15) contains visually perceivable, i.e., advertising, material (33).

18 Claims, 2 Drawing Sheets

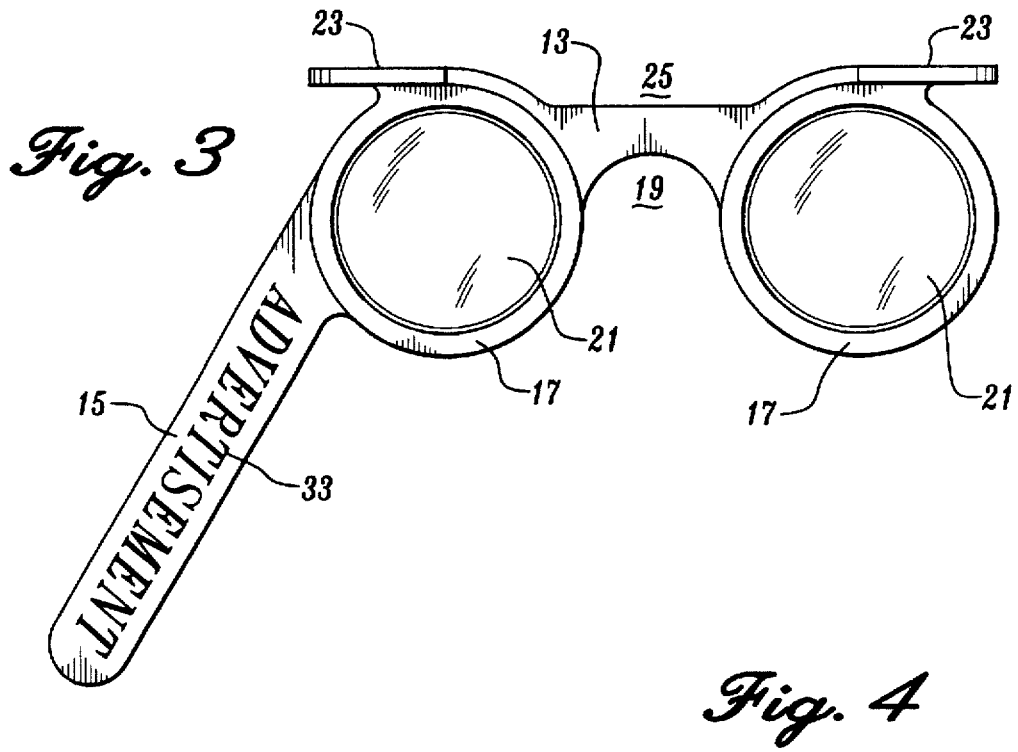
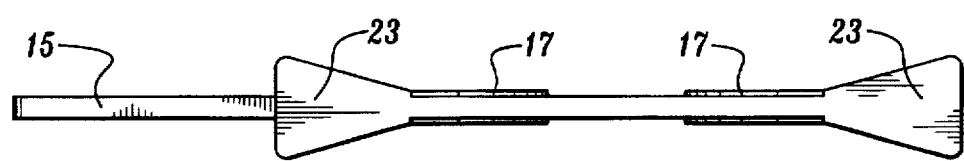
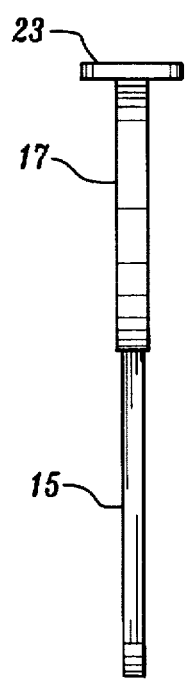

TEMPORARY READING EYEGLASSES

This invention relates to reading devices, e.g., eyeglasses and, more particularly, to temporary reading eyeglasses.

BACKGROUND OF THE INVENTION

Many situations exist where a person needs a temporary reading device. Even persons with good vision may occasionally need a temporary reading device to read the "small print" on a bottle label. One type of temporary reading device suitable for reading labels and the like is a magnifying glass. Unfortunately, magnifying glasses are not always readily available. Further, magnifying glasses are often expensive. Alternatively, a person can carry commercially available reading eyeglasses or have several pairs of reading eyeglasses stored at convenient locations, such as at the person's office, in the person's automobile, in various rooms of the person's house, etc. Unfortunately, reading eyeglasses tend to be forgotten if not used often. Moreover, it is expensive to have multiple reading eyeglasses stored at convenient locations. Thus, a need exists for an inexpensive, temporary reading device.

Advertisers are continuously looking for inexpensive products suitable for bearing an advertising message. The preferred products are those that are low in cost and likely to be used frequently. Low cost products can be distributed to the public for free. Products that are likely to be used frequently, such as bottle openers, for example, are desirable because the advertising message the product bears is seen each time the product is used.

Lorgnettes have been around for several years. Lorgnettes comprise a pair of reading lens mounted in a frame that also includes a nose aperture. An arm extends downwardly from one side of the frame. The user holds the outer end of the arm and positions the reading lens in front of the user's eyes when the user wants to read a message or better view an object. In the past, ornate and expensive lorgnettes have been produced.

The present invention is directed to provide inexpensive, lorgnette-type, temporary reading eyeglasses that are capable of bearing an advertising message.

SUMMARY OF THE INVENTION

In accordance with this invention, temporary reading eyeglasses in the form of a lorgnette that includes a relatively wide arm and a pair of support feet is provided. The support feet are located at the upper outer corners of the lens frame of the temporary reading eyeglasses and include flat outer surfaces that lie orthogonal to the plane of the lens frame. The feet provide a flat surface for supporting the temporary reading eyeglasses in an inverted position, i.e., with the arm angling upwardly. The relatively wide arm contains visually perceivable (advertising) material.

In accordance with further aspects of this invention, the entire structure of the temporary reading eyeglasses is injection molded.

In accordance with other aspects of this invention, the feet are of a generally triangular shape and expand outwardly from the upper outer corners of the lens frame.

In accordance with further aspects of the invention, the region of the lens frame between the feet is undercut, whereby a space exists between the feet when the feet are supported on a flat surface such that the arm angles upwardly.

As can be readily appreciated from the foregoing description, the invention provides inexpensive temporary reading eyeglasses. Because the temporary reading eyeglasses are inexpensive and include space for advertising material, they are suitable for widespread distribution by advertisers. Because the temporary reading glasses, i.e., the lorgnette, can be supported in an inverted position on a flat surface, such as a desktop, table, fireplace mantel, etc., the advertising material on the wide arm is not only perceivable when the temporary reading eyeglasses are being used, it is also perceivable during periods of nonuse when the temporary reading eyeglasses are located on a flat surface.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 3 is a front elevational view of the temporary reading eyeglasses illustrated in FIGS. 1 and 2;

FIG. 4 is a top view of the temporary reading eyeglasses illustrated in FIGS. 1 and 2; and FIG. 5 is a side view of the temporary reading eyeglasses illustrated in FIGS. 1 and 2.

DETAILED DESCRIPTION OF THE PREFERRED EMBODIMENT

Figure 1:
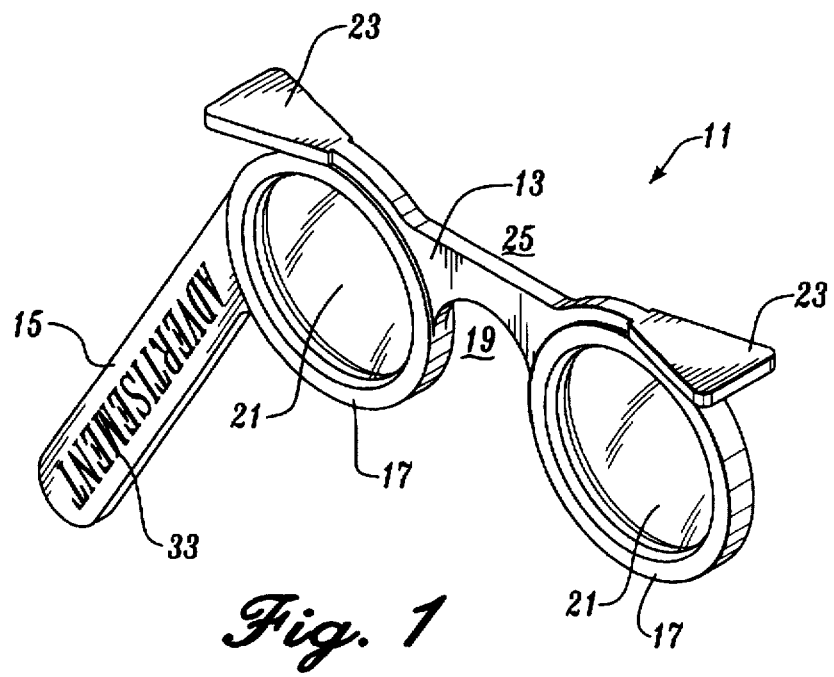
FIG. 1 is an isometric view of temporary reading eyeglasses, i.e., a lorgnette, formed in accordance with the invention in an upright position.

FIGS. 1–5 illustrate temporary reading eyeglasses, i.e., a lorgnette 11, formed in accordance with the invention. The temporary reading eyeglasses 11 include a frame 13 and an arm 15. The frame 13 includes a pair of lens regions 17 spaced apart by a nose piece region 19. The arm 15 extends outwardly, and downwardly when the lorgnette is in the upright position depicted in FIG. 1. When in the inverted position shown in FIG. 2 and described below, the arm 15 extends upwardly and outwardly from the frame 13.

Located on each of the lens regions 17 is a reading lens 21. Preferably, the reading lens 21 have similar optical power, +2.0 diopter, for example. Located along the upper edge of the frame 13 are a pair of feet 23. The feet are planar and have a generally triangular shape. The plane defined by the feet 23 lies orthogonal to the plane defined by the reading lenses 21. Preferably, the region of the frame 13 between the feet 23 is undercut whereby a space 25, lying above the nose piece region 19, lies between the feet 23.

The arm 15 is relatively wide, with the width dimension lying in the plane of the reading lenses 21. As a result, the width of the arm is adequate for supporting advertising material, such as an advertiser's name, slogan, etc.

Preferably, the entire temporary reading eyeglasses 11, including the frame 13, the arm 15, the reading lens 21, and the feet 23, are injection molded from a suitably rigid plastic material. Such temporary reading eyeglasses 11 are inexpensive to manufacture. Because they are inexpensive to manufacture, injection-molded temporary reading eyeglasses are suitable for widespread distribution, for free, by advertisers.

The size of the temporary reading eyeglasses 11 is, of course, similar to the size of conventional glasses. That is, the spacing between the lenses 21 is the average spacing between the eyes of potential users and the nose piece region 19 is sized to conform to the average size of the noses of potential users.

FIG. 1 illustrates the normal use position of the temporary reading eyeglasses 11. In this position, the frame 13 and, thus, the reading lenses 21 lie above the arm 15. The arm extends outwardly and downwardly from the frame. Further, the feet 23 extend outwardly from the top outer corners of the frame 13. In use, a user holds the lower end of the arm 15 and puts the reading lenses 21 in front of his or her eyes.

Figure 2:
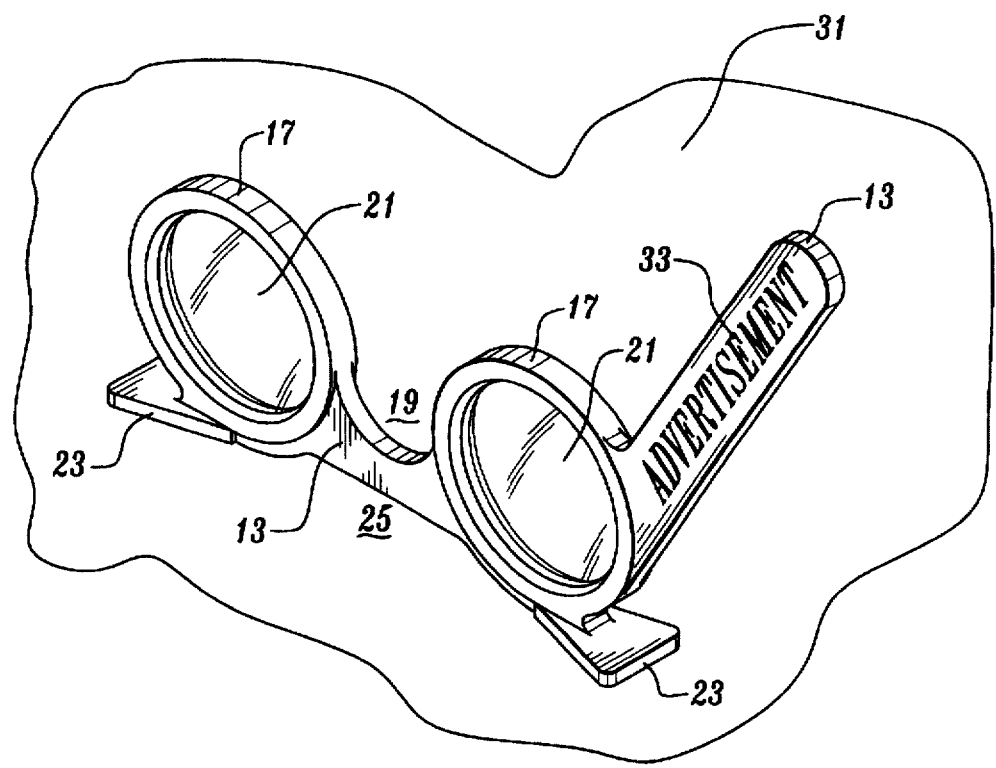
FIG. 2 is an isometric view of the temporary reading eyeglasses shown in FIG. 1 in an inverted position atop a flat surface.

FIG. 2 illustrates the nonuse position of the temporary reading eyeglasses 11. When not in use, the temporary reading eyeglasses 11 are placed on a horizontal surface 31, such as a desk top, table, mantle, etc. More specifically, the temporary reading eyeglasses are inverted from the position shown in FIG. 1 and the feet 23 are placed on the horizontal surface 31. As a result, the frame 13, lenses 21, and arm 15 lie in a plane that lies orthogonal to the horizontal surface 31. Further, the arm 15 extends upwardly and outwardly from the plane defined by the feet 23, i.e., from the horizontal surface 31, thereby making advertising material 33 on the arm easily viewable. While various angles of inclination between the horizontal surface 31 and the arm 15, denoted in FIG. 3, can be used, in one actual embodiment of the invention the chosen angle was sixty degrees (60°). The preferred α angle range is 90° to 45°.

While the preferred embodiment of the invention has been illustrated and described, it is to be understood that, within the scope of the appended claims, various changes can be made therein without departing from the spirit and scope of the invention. For example, rather than being triangular shaped, the feet can have other shapes. Further, the overall configuration of the temporary reading eyeglasses can be changed in a variety of ways.

The embodiments of the invention in which an exclusive property or privilege is claimed are defined as follows:

1. Temporary reading eyeglasses comprising:
   (a) a frame that includes a pair of spaced-apart lens apertures, a nose indentation located between the spaced-apart lens apertures;
   (b) a pair of lens, one of said lens positioned in each of said lens apertures;
   (c) an arm angling outwardly from one of said lens apertures; and
   (d) a pair of feet located adjacent said lens aperture, said pair of feet defining a plane that lies substantially orthogonal to the plane in which said lens apertures lie.

2. Temporary reading eyeglasses as claimed in claim 1, wherein said arm angles outwardly with respect to the plane defined by said feet.

3. Temporary reading eyeglasses as claimed in claim 2, wherein the angle between said arm and the plane defined by said feet is approximately sixty degrees (60°).

4. Temporary reading eyeglasses as claimed in claim 3, wherein said feet have a generally triangular shape in the plane defined by said feet.

5. Temporary reading eyeglasses as claimed in claim 4, wherein the region of said frame between said feet is undercut with respect to the plane of said feet.

6. Temporary reading eyeglasses as claimed in claim 5, wherein said frame, said feet and said arm are integrally formed.

7. Temporary reading eyeglasses as claimed in claim 6, wherein the entire temporary reading eyeglasses, including said frame, said feet said arm and said lens pieces are injection molded as a single item.

8. Temporary reading eyeglasses as claimed in claim 7, wherein said arm is wide and contains advertising material.

9. Temporary reading eyeglasses as claimed in claim 2, wherein said frame, said feet and said arm are integrally formed.

10. Temporary reading eyeglasses as claimed in claim 9, wherein said arm angles outwardly with respect to the plane defined by said feet.

11. Temporary reading eyeglasses as claimed in claim 9, wherein the entire temporary reading eyeglasses, including said frame, said feet, said arm and said lens pieces, are injection molded as a single item.

12. Temporary reading eyeglasses as claimed in claim 11, wherein said arm angles outwardly with respect to the plane defined by said feet.

13. Temporary reading eyeglasses as claimed in claim 11, wherein said arm is wide and contains advertising material.

14. Temporary reading eyeglasses as claimed in claim 13, wherein said arm angles outwardly with respect to the plane defined by said feet.

15. Temporary reading eyeglasses as claimed in claim 2, wherein the entire temporary reading eyeglasses, including said frame, said feet, said arm and said lens pieces, are injection molded as a single item.

16. Temporary reading eyeglasses as claimed in claim 15, wherein said arm angles outwardly with respect to the plane defined by said feet.

17. Temporary reading eyeglasses as claimed in claim 2, wherein said arm is wide and contains advertising material.

18. Temporary reading eyeglasses as claimed in claim 15, wherein said arm angles outwardly with respect to the plane defined by said feet.

* * * * *